United States Patent
Zhu

(10) Patent No.: US 11,362,792 B2
(45) Date of Patent: Jun. 14, 2022

(54) DATA TRANSMISSION METHOD, DEVICE, AND SYSTEM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 174 days.

(21) Appl. No.: 16/910,547

(22) Filed: Jun. 24, 2020

(65) Prior Publication Data

US 2020/0322110 A1   Oct. 8, 2020

Related U.S. Application Data

(63) Continuation of application No. PCT/CN2017/119412, filed on Dec. 28, 2017.

(51) Int. Cl.
*H04L 5/00* (2006.01)
*H04W 72/04* (2009.01)
*H04W 72/12* (2009.01)

(52) U.S. Cl.
CPC .......... *H04L 5/0053* (2013.01); *H04L 5/0007* (2013.01); *H04W 72/042* (2013.01);
(Continued)

(58) Field of Classification Search
CPC ............... H04L 5/0053; H04L 5/0007; H04W 72/0413; H04W 72/042; H04W 72/0446; H04W 72/0453; H04W 72/1289
(Continued)

(56) References Cited

U.S. PATENT DOCUMENTS 9,775,149 B2 *  9/2017  Fwu ................. H04W 52/0216
11,005,632 B2 *  5/2021  Ekpenyong .......... H04L 5/1438
(Continued)

FOREIGN PATENT DOCUMENTS

CN       101426267 A      5/2009
CN       102026206 A      4/2011
(Continued)

OTHER PUBLICATIONS

Extended European Search Report of counterpart EP Application No. 17936636.4 dated Nov. 19, 2020.
(Continued)

*Primary Examiner* — Peter G Solinsky
(74) *Attorney, Agent, or Firm* — Finnegan, Henderson, Farabow, Garrett & Dunner, L.L.P.

(57) ABSTRACT

A data transmission method, applied to a base station, includes: acquiring target information for indicating transmission direction from pre-configured indication unit allocation information, the target information for indicating transmission direction being configured for a terminal to determine transmission directions of uplink data transmission on an uplink slot and downlink data transmission on a downlink slot in a frequency division duplexing (FDD) mode; and sending the target information for indicating transmission direction to the terminal, to cause the terminal to determine respective transmission directions of the uplink slot and the downlink slot in the FDD mode according to the target information for indicating transmission direction.

20 Claims, 16 Drawing Sheets

(52) U.S. Cl.
CPC ... *H04W 72/0413* (2013.01); *H04W 72/0446* (2013.01); *H04W 72/0453* (2013.01); *H04W 72/1289* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2011/0149813 | A1* | 6/2011 | Parkvall | H04W 72/0446 370/280 |
| 2013/0194982 | A1* | 8/2013 | Fwu | H04L 5/1469 370/280 |
| 2016/0338052 | A1* | 11/2016 | Ji | H04L 1/1822 |
| 2018/0054812 | A1* | 2/2018 | Luo | H04W 52/386 |
| 2018/0092125 | A1* | 3/2018 | Sun | H04W 74/02 |
| 2021/0400654 | A1* | 12/2021 | Ibrahim | H04W 72/0406 |

FOREIGN PATENT DOCUMENTS

| | | |
|---|---|---|
| CN | 102231916 A | 11/2011 |
| CN | 102448148 A | 5/2012 |
| CN | 102958173 A | 3/2013 |
| CN | 104579589 A | 4/2015 |
| CN | 104811411 A | 7/2015 |
| CN | 105099601 A | 11/2015 |
| CN | 105722111 A | 6/2016 |
| CN | 107223362 A | 9/2017 |
| EP | 3 654 709 A1 | 5/2020 |
| EP | 3 668 215 A1 | 6/2020 |
| IN | 202047008162 A | 2/2020 |
| IN | 201927024220 A | 5/2020 |
| WO | WO 2012/150765 A2 | 11/2012 |

OTHER PUBLICATIONS

LG Electronics, Discussion on group common PDCCH, 3GPP TSG RAN WG1 NR Ad Hoc #3, R1-1715873, Nagoya, Japan, Sep. 18-21, 2017, 7 pages.

Vivo, Design of group-common PDCCH, 3GPP TSG RAN WG1 Meeting 90bis, R1-1717485, Prague, CZ, Oct. 9-13, 2017, 10 pages.

International Search Report and Written Opinion of PCT Application No. PCT/CN2017/119412 dated Sep. 19, 2018.

First Office Action of Chinese Application No. 201780002251.5 dated Jun. 24, 2019.

Second Office Action of Chinese Application No. 201780002251.5 dated Oct. 11, 2019.

Third Office Action of Chinese Application No. 201780002251.5 dated Feb. 18, 2020.

Examination Report of Indian Application No. 202027031235, dated Nov. 11, 2021.

* cited by examiner

DATA TRANSMISSION METHOD, DEVICE, AND SYSTEM

CROSS-REFERENCE TO RELATED APPLICATION

This application is a continuation application of International Application PCT/CN2017/119412, filed Dec. 28, 2017, the entire content of which is incorporated herein by reference.

TECHNICAL FIELD

The present disclosure relates to the field of wireless communication technologies, and more particularly to a data transmission method, device and system.

BACKGROUND

In the field of wireless communication, duplex communication has two modes: a time division duplexing (TDD) mode and a frequency division duplexing (FDD) mode. In the TDD mode, uplink data and downlink data are transmitted on different time slots of a same carrier; while in the FDD mode, uplink data and downlink data are transmitted on different carriers.

In the traditional FDD system, a downlink carrier can only be used to transmit downlink data, and an uplink carrier can only be used to transmit uplink data. With the advent of emerging Internet applications such as the new generation of virtual reality (or augmented reality) and vehicle-to-vehicle communication, higher requirements have arisen for wireless communication technologies, which requires a terminal to be able to support more types of services. However, by continuing the fixed uplink and downlink time slot allocation method, the flexibility is relatively lower, and the terminal cannot smoothly support more service types. For an FDD system, in order to ensure the extendibility of the system, it is possible that a certain part of resources have been reserved on both the downlink carrier and the uplink carrier, for purpose of introducing potential technologies in the future. Therefore, for an FDD system, it is desired to provide a scheme in which the terminal in the FDD mode may obtain dynamic information for indicating transmission direction to achieve the data transmission under the FDD mode.

SUMMARY

According to a first aspect of the present disclosure, there is provided a data transmission method, applied to a base station. The method comprises: acquiring target information for indicating transmission direction from pre-configured indication unit allocation information, the target information for indicating transmission direction being configured for a terminal to determine transmission directions of uplink data transmission on an uplink slot and downlink data transmission on a downlink slot in a frequency division duplexing (FDD) mode; and sending the target information for indicating transmission direction to the terminal, to cause the terminal to determine respective transmission directions of the uplink slot and the downlink slot in the FDD mode according to the target information for indicating transmission direction. The pre-configured indication unit allocation information comprises multiple pieces of information for indicating transmission direction, the target information for indicating transmission direction is one of the multiple pieces of information for indicating transmission direction, and each of the multiple pieces of information for indicating transmission direction comprises indication unit allocation information of downlink carrier and indication unit allocation information of uplink carrier. The indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for a uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

According to a second aspect of the present disclosure, there is provided a data transmission method, applied to a terminal. The method comprises: receiving target information for indicating transmission direction sent by a base station, the target information for indicating transmission direction comprising indication unit allocation information of downlink carrier and indication unit allocation information of uplink carrier; and determining, based on the indication unit allocation information of downlink carrier and the indication unit allocation information of uplink carrier, transmission directions of uplink data transmission on an uplink slot and downlink data transmission on a downlink slot in a frequency division duplexing (FDD) mode. The target information for indicating transmission direction is one of multiple pieces of information for indicating transmission direction acquired by the base station, and each of the multiple pieces of information for indicating transmission direction comprises indication unit allocation information of downlink carrier and indication unit allocation information of uplink carrier. The indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for an uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

According to a third aspect of the present disclosure, there is provided a base station. The base station comprises: a processor; and a memory storing instructions executable by the processor; wherein the processor is configured to: acquire target information for indicating transmission direction from pre-configured indication unit allocation information, the target information for indicating transmission direction being configured for a terminal to determine transmission directions of uplink data transmission on an uplink slot and downlink data transmission on a downlink slot in a frequency division duplexing (FDD) mode; and send the target information for indicating transmission direction to the terminal, to cause the terminal to determine respective transmission directions of the uplink slot and the downlink slot in the FDD mode according to the target information for indicating transmission direction. The pre-configured indication unit allocation information comprises multiple pieces of information for indicating transmission direction, the target information for indicating transmission direction is one of the multiple pieces of information for indicating transmission direction, and each of the multiple pieces of information for indicating transmission direction comprises indication unit allocation information of downlink carrier and indication unit allocation information of uplink carrier. The indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for a uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

According to a fourth aspect of the present disclosure, there is provided a terminal. The terminal comprises: a processor; and a memory storing instructions executable by the processor; wherein the processor is configured to: receive target information for indicating transmission direction sent by a base station, the target information for indicating transmission direction comprising indication unit allocation information of downlink carrier and indication unit allocation information of uplink carrier; and determine, based on the indication unit allocation information of downlink carrier and the indication unit allocation information of uplink carrier, transmission directions of uplink data transmission on an uplink slot and downlink data transmission on a downlink slot in a frequency division duplexing (FDD) mode. The target information for indicating transmission direction is one of multiple pieces of information for indicating transmission direction acquired by the base station, and each of the multiple pieces of information for indicating transmission direction comprises indication unit allocation information of downlink carrier and indication unit allocation information of uplink carrier. The indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for an uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

The technical solutions provided by embodiments of the present disclosure may include the following benefits. In the embodiments, the terminal can acquire dynamic information for indicating transmission direction in the FDD mode, thereby improving extendibility of the system and enabling the terminal to smoothly support abundant types of service.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices consistent with aspects related to the present disclosure as recited in the appended claims.

Figure 1:
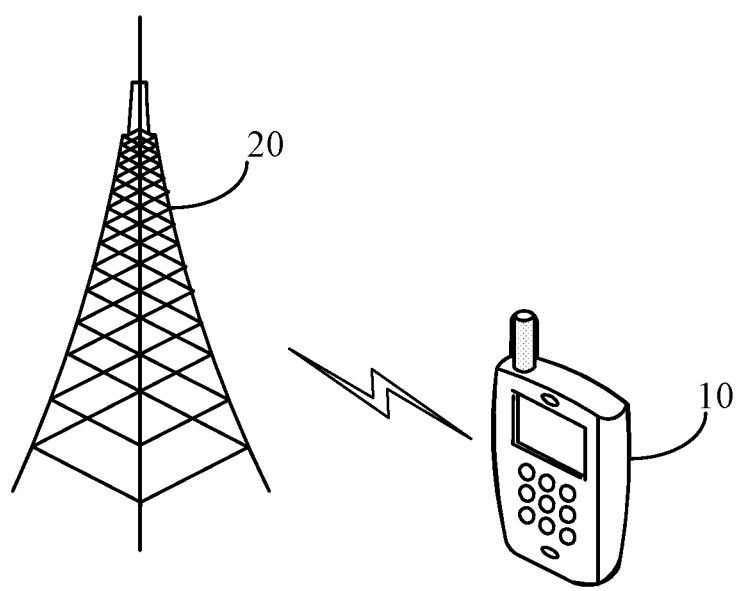
FIG. 1 is a schematic diagram of an environment for implementing a data transmission method provided by an embodiment of the present disclosure.

FIG. 1 is a schematic diagram of an environment for implementing a data transmission method provided by an embodiment of the present disclosure. The implementation environment may include a terminal 10 and a base station 20.

The terminal 10 may be a mobile platform, a mobile station, a remote station, an access point, a remote terminal device, an access terminal device, a user terminal device, a user agent, user equipment, a subscriber station, a subscriber unit, a mobile terminal device, a wireless terminal device, or the like. For example, the terminal may be a mobile phone (or referred to as a "cellular" phone), a cordless phone, a session initiation protocol (SIP) phone, a wireless local loop (WLL) station, a personal digital assistant (PDA), a handheld device with a wireless communication function, a computing device or other processing device connected to a wireless modem, a vehicle-mounted device, a wearable device, a mobile platform in a future 5G network, a terminal device in an evolved public land mobile network (PLMN) in the future, or the like.

Figure 2:
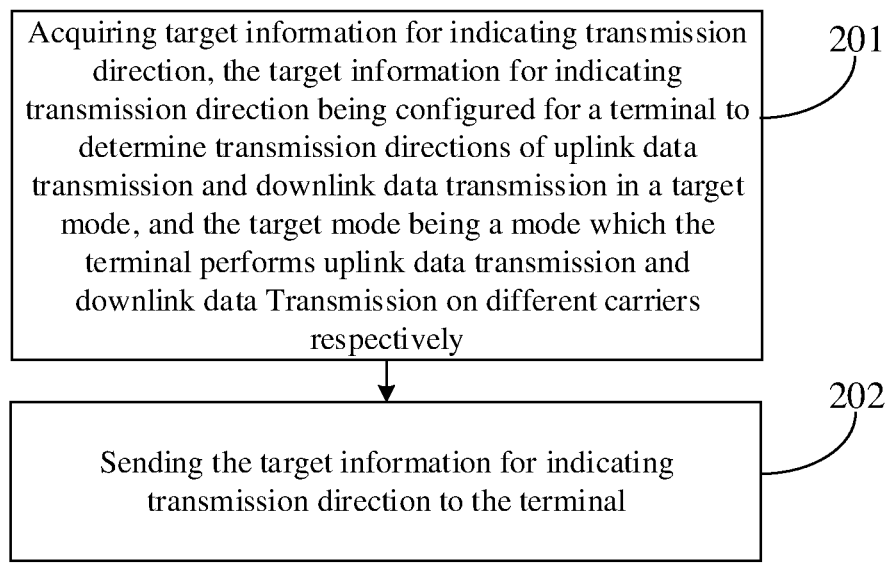
FIG. 2 is a flowchart of a data transmission method in accordance with an exemplary embodiment.

FIG. 2 is a flowchart of a data transmission method in accordance with an exemplary embodiment. The data transmission method can be applied to the base station 20 in the implementation environment shown in FIG. 1. The data transmission method may include the following steps.

In step 201, target information for indicating transmission direction is acquired, wherein the target information for indicating transmission direction is configured for a terminal to determine transmission directions of uplink data transmission and downlink data transmission in a target mode, and the target mode is a mode in which the terminal performs uplink data transmission and downlink data transmission on different carriers respectively.

In step 202, the target information for indicating transmission direction is sent to the terminal.

In the embodiment, the base station can acquire the target information for indicating transmission direction, and then send the target information for indicating transmission direction to the terminal, such that the terminal determines the transmission directions of the uplink data transmission and downlink data transmission in the target mode based on the target information for indicating transmission direction, wherein the target mode is a mode in which the terminal performs uplink data transmission and downlink data transmission on different carriers respectively. By means of this method, the terminal can acquire dynamic information for indicating transmission direction in the target mode, to achieve the data transmission in the target mode.

Figure 3:
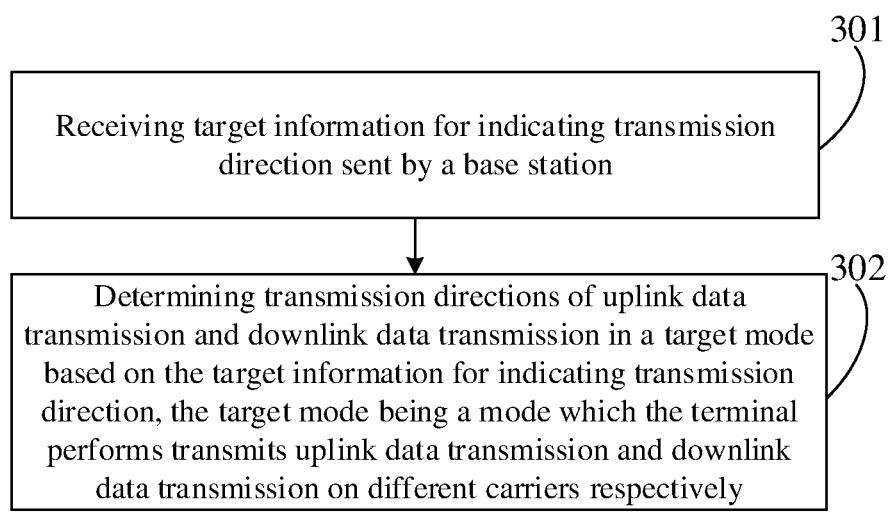
FIG. 3 is a flowchart of a data transmission method in accordance with an exemplary embodiment.

FIG. 3 is a flowchart of a data transmission method in accordance with an exemplary embodiment. The data transmission method can be applied to the terminal 10 in the implementation environment shown in FIG. 1. The data transmission method may include the following steps.

In step 301, target information for indicating transmission direction sent by a base station is received.

In step 302, transmission directions of uplink data transmission and downlink data transmission in a target mode are determined based on the target information for indicating transmission direction, wherein the target mode is a mode in which the terminal performs uplink data transmission and downlink data transmission on different carriers respectively.

In the embodiment, the terminal can receive the target information for indicating transmission direction sent by the base station, and then determine the transmission directions of the uplink data transmission and downlink data transmission in the target mode based on the target information for indicating transmission direction, wherein the target mode is a mode in which the terminal performs uplink data transmission and downlink data transmission on different carriers respectively. By means of this method, the terminal can acquire dynamic information for indicating transmission direction in the target mode, to achieve the data transmission in the target mode.

Figure 4:
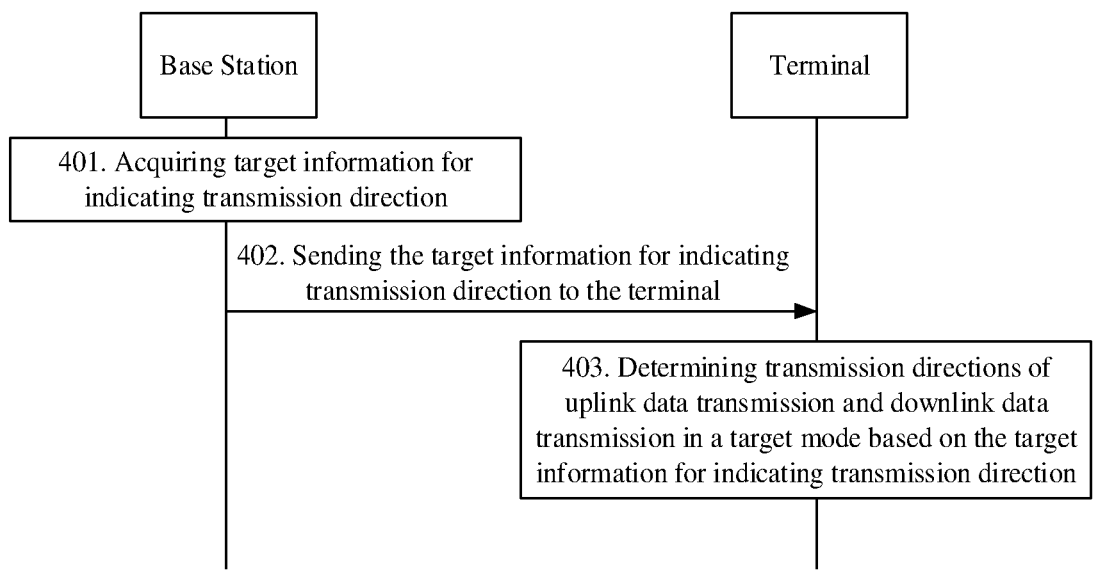
FIG. 4 is a flowchart of a data transmission method in accordance with an exemplary embodiment.

FIG. 4 is a flowchart of a further data transmission method in accordance with an exemplary embodiment. The data transmission method can be applied in the implementation environment shown in FIG. 1. The data transmission method may include the following steps.

In step 401, a base station acquires target information for indicating transmission direction.

The target mode is a mode in which the terminal performs uplink data transmission and downlink data transmission on different carriers respectively. Exemplarily, the target mode may be an FDD mode. In the FDD mode, the uplink data and the downlink data are transmitted on different carriers, and uplink and downlink are distinguished by different frequencies. A downlink channel from the base station to the terminal uses a carrier c1, and an uplink channel from the terminal to the base station uses another carrier c2 symmetrical to c1, with sufficient protective bands being reserved between c1 and c2.

It should be noted that the carrier in the embodiment of the present disclosure may be an independent carrier or a frequency domain band width part (BWP) on a carrier. The embodiment of the present disclosure is described by taking a case that the carrier is an independent carrier as an example.

In step 402, the base station sends the target information for indicating transmission direction to the terminal.

In step 403, the terminal determines transmission directions of the uplink data transmission and downlink data transmission in the target mode based on the target information for indicating transmission direction.

In the embodiment of the present disclosure, the base station can acquire the target information for indicating transmission direction in a number of ways. For example, the base station may pre-configure indication unit allocation information, and then acquire the target information for indicating transmission direction from the indication unit allocation information; or, the base station may pre-configure a detection time the terminal detects a physical layer channel, and determine the detection time as the target information for indicating transmission direction. In the embodiment of the present disclosure, the data transmission method will be described by taking the following two implementable manners as examples.

Figure 5:
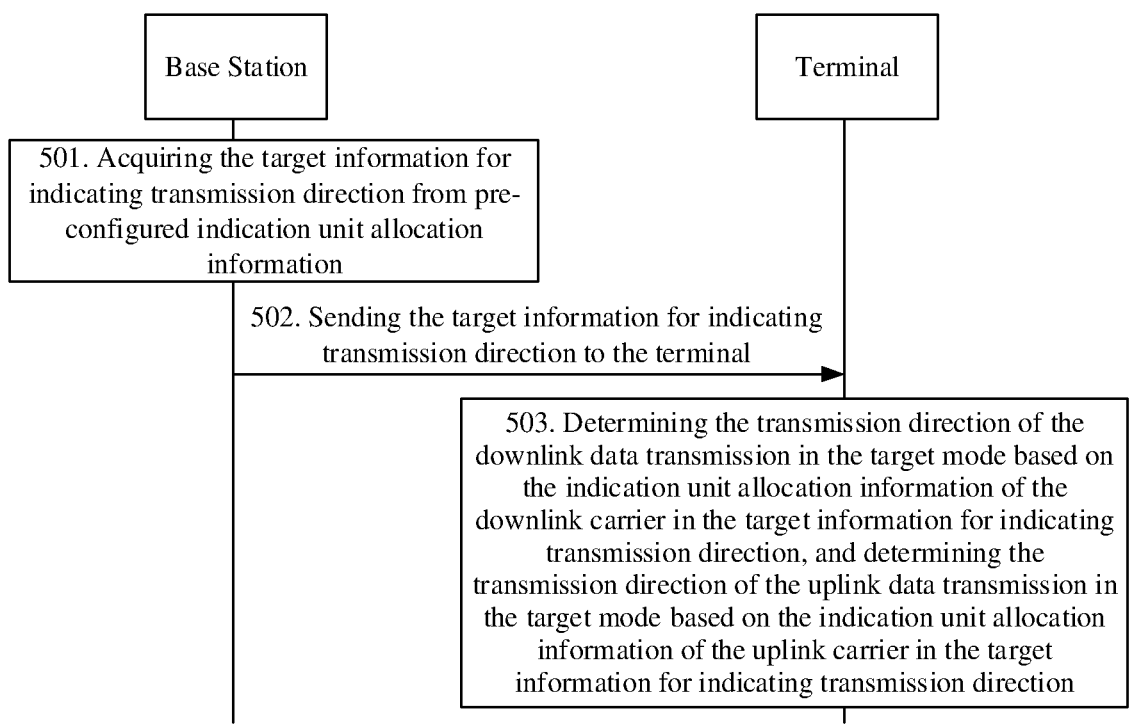
FIG. 5 is a flowchart of a data transmission method in accordance with an exemplary embodiment.

In the first implementation manner, when the indication unit allocation information is pre-configured in the base station, as shown in FIG. 5, the data transmission method may include the following steps.

In step 501, the base station acquires the target information for indicating transmission direction from the pre-configured indication unit allocation information.

The target information for indicating transmission direction is configured for the terminal to determine the transmission directions of the uplink data transmission and downlink data transmission in the target mode. The target mode is a mode in which the terminal performs uplink data transmission and downlink data transmission on different carriers respectively. Exemplarily, the target mode may be an FDD mode.

The indication unit allocation information includes multiple pieces of information for indicating transmission direction, the target information for indicating transmission direction is one of the multiple pieces of information for indicating transmission direction, and each piece of information for indicating transmission direction includes indication unit allocation information of downlink carrier and indication unit allocation information of uplink carrier.

For an FDD system, in order to ensure the extendibility of the system, a part of resources may be reserved on both the downlink carrier and the uplink carrier for use in potential future technologies that may be introduced. In the embodiment of the present disclosure, the base station pre-configures multiple pieces of information for indicating transmission direction, wherein the indication unit allocation information of downlink carrier in each piece of information for indicating transmission direction is used to reserve a part of resources for the downlink carrier, and the indication unit allocation information of uplink carrier is used to reserve a part of resources for the uplink carrier.

Exemplarily, the indication unit may be a time slot, a subframe, a radio frame, or an orthogonal frequency division multiplexing (OFDM) symbol.

In a case that the indication unit is a time slot, the base station may pre-configure time slot allocation information. The time slot allocation information may include multiple pieces of information for indicating transmission direction, and each information for indicating transmission direction includes time slot allocation information of downlink carrier and time slot allocation information of uplink carrier. The base station may acquire the target information for indicating transmission direction from the indication unit allocation information. For the same information for indicating transmission direction, the time slot allocation information of downlink carrier and the time slot allocation information of uplink carrier may be the same or may be different. When a time slot state of downlink carrier and a time slot state of uplink carrier are both unknown, the time slot allocation information of downlink carrier is the same as the time slot allocation information of uplink carrier. The unknown state is configured to indicate that the time slot is neither an uplink time slot nor a downlink time slot.

Exemplarily, the time slot allocation information configured by the base station can be shown in Table 1. Referring to Table 1, the time slot allocation information includes four pieces of information for indicating transmission direction. The information for indicating transmission direction No. 1 includes time slot allocation information of downlink carrier f1 and time slot allocation information of uplink carrier f2. Here, the f1 and f2 may be the same or may be different.

TABLE 1

| No. | Information for indicating transmission direction |
| --- | --- |
| 1 | Time slot allocation information of downlink carrier f1<br>Time slot allocation information of uplink carrier f2 |
| 2 | Time slot allocation information of downlink carrier f3<br>Time slot allocation information of uplink carrier f4 |
| 3 | Time slot allocation information of downlink carrier f5<br>Time slot allocation information of uplink carrier f6 |
| 4 | Time slot allocation information of downlink carrier f7<br>Time slot allocation information of uplink carrier f8 |

In step 502, the base station sends the target information for indicating transmission direction to the terminal.

In an embodiment, the step 502 may include: sending, by the base station, the target information for indicating transmission direction to the terminal through a physical layer channel, wherein the physical layer channel is a physical layer channel carrying common control information. Exemplarily, the physical layer channel may be a common group physical downlink control channel (GC-PDCCH). Correspondingly, the terminal receives the target information for indicating transmission direction sent by the base station.

Taking the indication unit allocation information shown in Table 1 as an example, the base station may acquire the information for indicating transmission direction No. 1 from Table 1, and determine the information for indicating transmission direction as the target information for indicating transmission direction. The target information for indicating transmission direction includes the time slot allocation information of downlink carrier f1 and the time slot allocation information of uplink carrier f2. The base station may then send the target information for indicating transmission direction to the terminal.

In step 503, the terminal determines the transmission direction of the downlink data transmission in the target mode based on the indication unit allocation information of downlink carrier in the target information for indicating transmission direction, and determines the transmission direction of the uplink data transmission in the target mode based on the indication unit allocation information of uplink carrier in the target information for indicating transmission direction.

Exemplarily, the base station determines the information for indicating transmission direction No. 1 in Table 1 as the target information for indicating transmission direction, then, the terminal may determine the transmission direction of the downlink data transmission in the target mode based on the time slot allocation information of downlink carrier f1 in the target information for indicating transmission direction, and determine the transmission direction of uplink data transmission in the target mode based on the time slot allocation information of uplink carrier f2 in the target information for indicating transmission direction.

In the embodiments, the base station can acquire the target information for indicating transmission direction from the pre-configured indication unit allocation information, and then send the target information for indicating transmission direction to the terminal. The terminal then determines the transmission directions of uplink data transmission and downlink data transmission in the target mode based on the target information for indicating transmission direction, wherein the target mode is a mode in which the terminal performs uplink data transmission and downlink data transmission on different carriers respectively. By means of this method, the terminal can acquire dynamic information for indicating transmission direction in the target mode, to achieve the data transmission in the target mode.

In the second implementation manner, when the base station pre-configures a detection time the terminal detects a physical layer channel, in a first aspect, the detection time may be configured to instruct the terminal to detect a physical layer channel carrying the indication unit allocation information of downlink carrier, or to detect a physical layer channel carrying the indication unit allocation information of uplink carrier; in a second aspect, the detection time may only instruct the terminal to detect a physical layer channel carrying the indication unit allocation information, and the terminal then determines, based on a preset configuration, whether the detection time is configured for detecting a physical layer channel carrying the indication unit allocation information of downlink carrier, or to detect a physical layer channel carrying the indication unit allocation information of uplink carrier. The data transmission method will be described by taking these two aspects as examples in the following.

Figure 6:
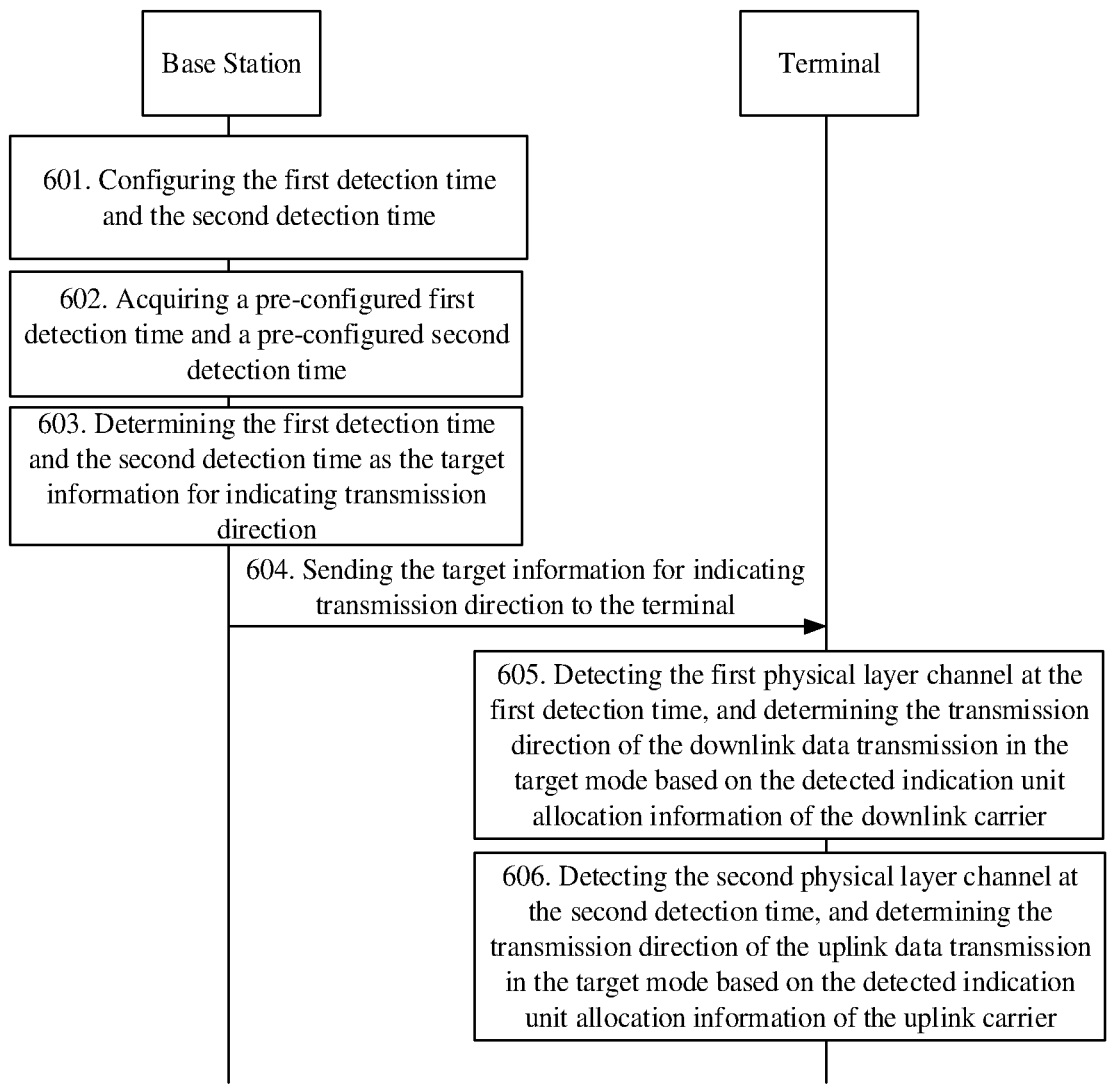
FIG. 6 is a flowchart of a data transmission method in accordance with an exemplary embodiment.

In the first aspect, as shown in FIG. 6, the data transmission method may include the following steps.

In step 601, a first detection time and a second detection time are configured in the base station.

The first detection time is a time the terminal detects a first physical layer channel, and the second detection time is a time the terminal detects a second physical layer channel. Here, the first physical layer channel carries indication unit allocation information of downlink carrier, and the second physical layer channel carries indication unit allocation information of uplink carrier. The indication unit allocation information of downlink carrier is configured for the downlink carrier to reserve a part of resources, and the indication unit allocation information of uplink carrier is configured for the uplink carrier to reserve a part of the resources. The first physical layer channel and the second physical layer channel are physical layer channels carrying common control information. Exemplarily, the physical layer channel may be a GC-PDCCH.

It should be noted that the positions (also referred to as a search space) where the first physical layer channel and the second physical layer channel are located may be the same or different.

In the embodiments of the present disclosure, a detection period of the first detection time and a detection period of the second detection time may be the same or different.

Exemplarily, the indication unit may be a time slot, a subframe, a radio frame, or an OFDM symbol.

In step 601, the first detection time and the second detection time may be configured by the base station based on high-level signaling, Media Access Control control element (MAC CE), or physical layer signaling.

For the descriptions of high-level signaling and physical layer signaling, reference can be made to related arts, and details are not described herein again.

In step 602, the pre-configured first detection time and second detection time are acquired by the base station.

The base station acquires the first detection time and the second detection time which are configured in step 601.

In step 603, the first detection time and the second detection time are determined as the target information for indicating transmission direction by the base station.

The base station determines the first detection time and the second detection time which are acquired in step 602 as the target information for indicating transmission direction. The target information for indicating transmission direction is configured for the terminal to determine transmission directions of uplink data transmission and downlink data transmission in the target mode. The target mode is a mode in which the terminal performs uplink data transmission and downlink data transmission on different carriers respectively. Exemplarily, the target mode may be an FDD mode.

In step 604, the base station sends the target information for indicating transmission direction to the terminal.

In this step, the base station may send the first detection time and the second detection time to the terminal through the same signaling. Alternatively, the base station may send the first detection time and the second detection time to the terminal through different signaling respectively, which is not limited in the embodiment of the present disclosure.

In step 605, the terminal may detect the first physical layer channel at the first detection time, and determine the transmission direction of the downlink data in the target mode based on the detected indication unit allocation information of downlink carrier.

The terminal detects the first physical layer channel at the first detection time. Because the first physical layer channel carries the indication unit allocation information of downlink carrier, the terminal can obtain the indication unit allocation information of downlink carrier, and thus can further determine a transmission direction of downlink data in the target mode according to the indication unit allocation information of downlink carrier.

In step 606, the terminal may detect the second physical layer channel at the second detection time, and determine the transmission direction of the uplink data transmission in the target mode based on the detected indication unit allocation information of uplink carrier.

The terminal detects the second physical layer channel at the second detection time. Because the second physical layer channel carries the indication unit allocation information of uplink carrier, the terminal can obtain the indication unit allocation information of uplink carrier, and thus can further determine the transmission direction of the uplink data in the target mode according to the indication unit allocation information of uplink carrier.

Figure 7:
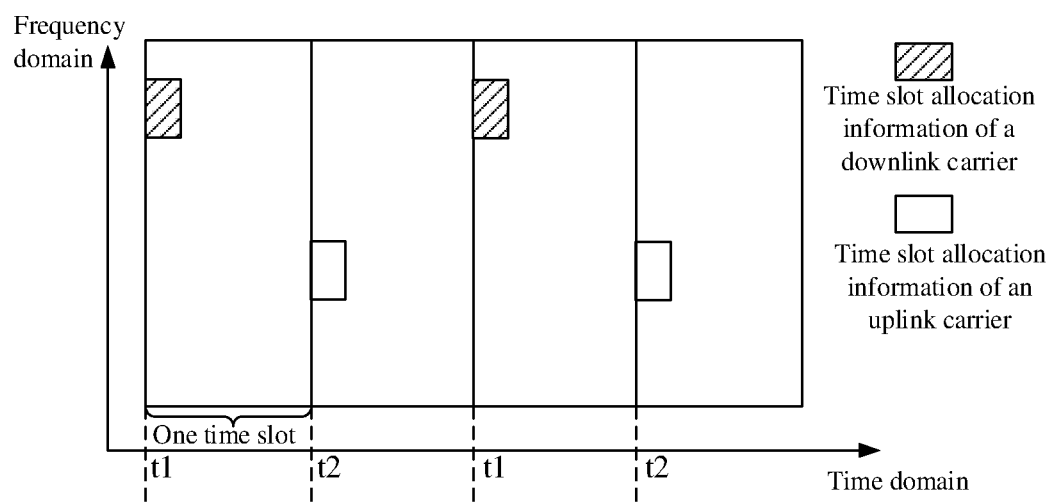
FIG. 7 is a schematic diagram of a first detection time and a second detection time in the embodiment shown in FIG. 6.

In the case that the indication unit is a time slot, FIG. 7 exemplarily shows a schematic diagram of a first detection time t1 and a second detection time t2. In FIG. 7, the horizontal axis represents the time domain, and the vertical axis represents the frequency domain. The terminal detects a first physical layer channel at t1 to obtain time slot allocation information of downlink carrier and detects a second physical layer channel at t2 to obtain time slot allocation information of uplink carrier. The terminal determines the transmission direction of the downlink data transmission in the target mode based on the time slot allocation information of downlink carrier, and determines the transmission direction of the uplink data transmission in the target mode based on the time slot allocation information of uplink carrier.

In the embodiments, the base station pre-configures the detection time the terminal detects the physical layer signal. The base station, according to the detection time, instructs the terminal to detect the physical layer channel carrying the indication unit allocation information of downlink carrier, or detect the physical layer channel carrying the indication unit allocation information of uplink carrier, such that the terminal determines the transmission directions of the uplink data transmission and downlink data transmission in the target mode. Here, the target mode is a mode in which the terminal performs uplink data transmission and downlink data transmission on different carriers respectively. By means of this method, the terminal can acquire dynamic information for indicating transmission direction in the target mode, to achieve the data transmission in the target mode.

Figure 8:
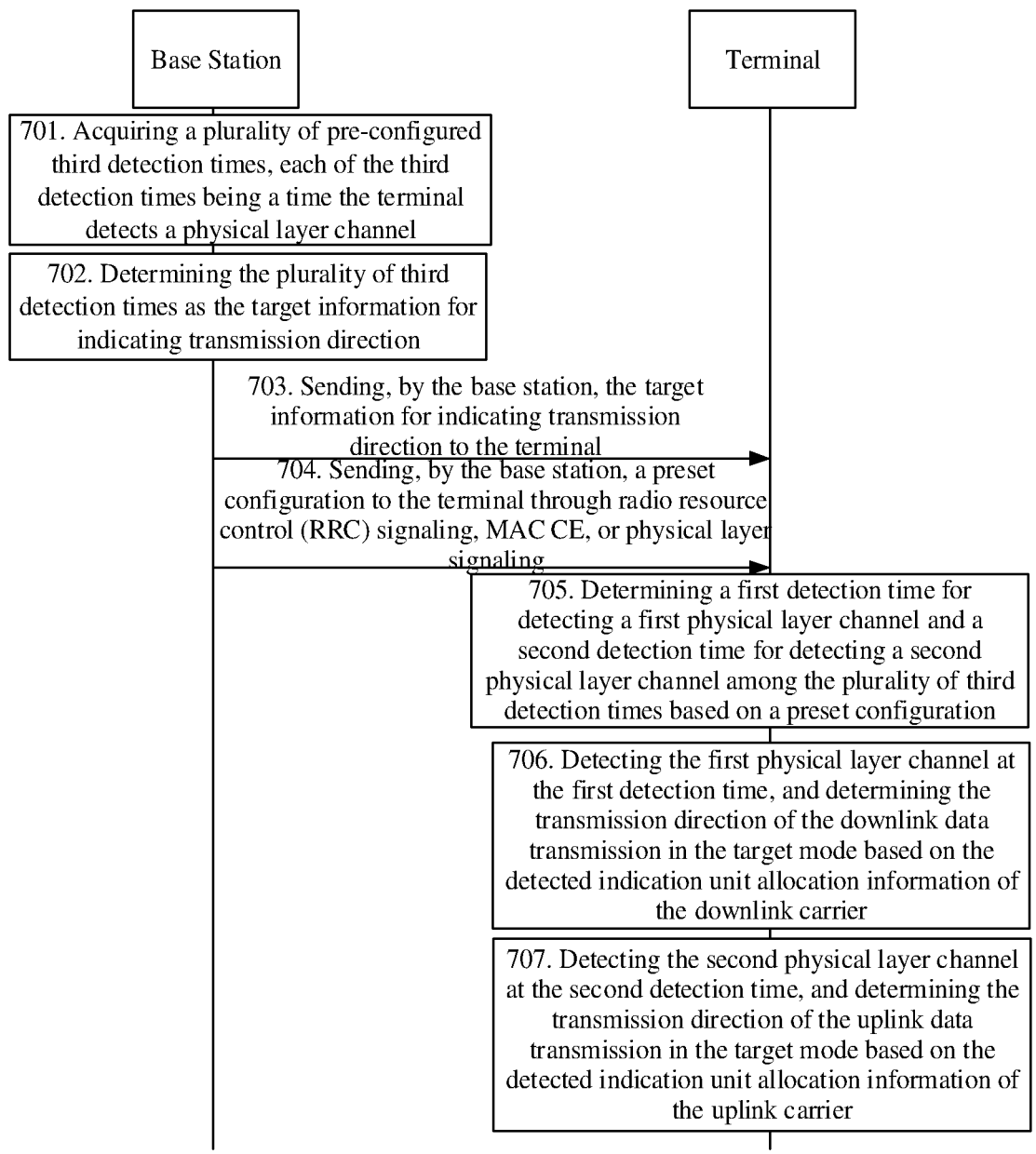
FIG. 8 is a flowchart of a data transmission method in accordance with an exemplary embodiment.

In the second aspect, as shown in FIG. 8, the data transmission method may include the following steps.

In step 701, the base station acquires a plurality of pre-configured third detection times, each of the third detection times being a time the terminal detects a physical layer channel.

The physical layer channel carries indication unit allocation information, and is a physical layer channel carrying common control information. Exemplarily, the physical layer channel may be a GC-PDCCH.

In the embodiment of the present disclosure, the third detection time only instructs the terminal to detect the physical layer channel carrying the indication unit allocation information. Exemplarily, the indication unit may be a time slot, a subframe, a radio frame, or an OFDM symbol.

In step 702, the plurality of third detection times may be determined by the base station as the target information for indicating transmission direction.

The base station determines the plurality of third detection times acquired in step 701 as the target information for indicating transmission direction.

In step 703, the target information for indicating transmission direction is sent by the base station to the terminal.

In step 704, a preset configuration is sent by the base station to the terminal through RRC signaling, MAC CE, or physical layer signaling. Correspondingly, the terminal receives the preset configuration sent by the base station through the RRC signaling, MAC CE, or physical layer signaling.

The preset configuration is used to indicate a first detection time for detecting a first physical layer channel and a second detection time for detecting a second physical layer channel among the plurality of third detection times. The first physical layer channel carries indication unit allocation information of downlink carrier, and the second physical layer channel carries indication unit allocation information of uplink carrier.

In the case that there are four third detection times, exemplarily, the preset configuration may be as follows: the first one is the first detection time for detecting the first physical layer channel; the second one is the second detection time for detecting the second physical layer channel; the third one is the first detection time for detecting the first physical layer channel; the fourth one is the second detection time for detecting the second physical layer channel; as such, the first detection time and the second detection time alternate. Or, the preset configuration may be as follows: the first two third detection times are the first detection time for detecting the first physical layer channel; the subsequent two third detection times are the second detection time for detecting the second physical layer channel; and the two consecutive third detection times are in a group. In the embodiment of the present disclosure, the preset configuration may be various. The contents of the preset configuration are not limited in the embodiment of the present disclosure.

It should be noted that the sequence of step 704 and step 703 is not limited, that is, step 703 may be executed first, then step 704; or step 704 may be executed first, then step 703; or step 703 and step 704 may be executed simultaneously.

Additionally, it should also be noted that in the embodiment of the present disclosure, step 704 may be an optional step. That is, it is possible that the base station does not send a preset configuration to the terminal. In this case, the preset configuration can be preset in the protocol.

In step 705, the first detection time for detecting the first physical layer channel and the second detection time for detecting the second physical layer channel among the plurality of third detection times are determined by the base station based on the preset configuration.

The first physical layer channel carries the indication unit allocation information of downlink carrier, and the second physical layer channel carries the indication unit allocation information of uplink carrier. The indication unit allocation information of downlink carrier is configured for the downlink carrier to reserve a part of resources, and the indication unit allocation information of uplink carrier is configured for the uplink carrier to reserve a part of the resources.

On the one hand, the terminal may determine the first detection time and the second detection time based on the preset configuration sent by the base station in step 704. On the other hand, the terminal may determine the first detection time and the second detection time based on the preset configuration which is preset in the protocol.

In step 706, the terminal detects the first physical layer channel at the first detection time, and determines the transmission direction of the downlink data transmission in the target mode based on the detected indication unit allocation information of downlink carrier.

The terminal detects the first physical layer channel at the first detection time. Because the first physical layer channel carries the indication unit allocation information of downlink carrier, the terminal can obtain the indication unit allocation information of downlink carrier, and thus can further determine the transmission direction of the downlink data transmission in the target mode according to the indication unit allocation information of downlink carrier.

In step 707, the terminal detects the second physical layer channel at the second detection time, and determines the transmission direction of the uplink data transmission in the target mode based on the detected indication unit allocation information of uplink carrier.

The terminal detects the second physical layer channel at the second detection time. Because the second physical layer channel carries the indication unit allocation information of uplink carrier, the terminal can obtain the indication unit allocation information of uplink carrier, and thus can further determine the transmission direction of the uplink data transmission in the target mode according to the indication unit allocation information of uplink carrier.

Figure 9:
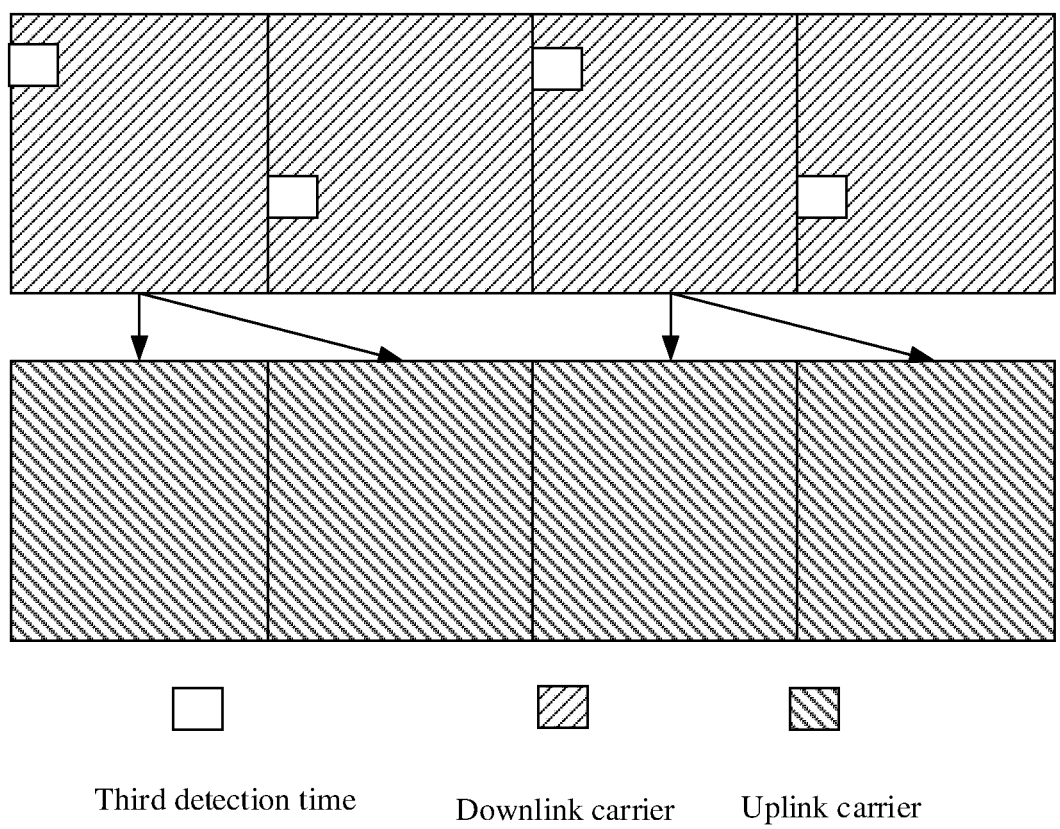
FIG. 9 is a schematic diagram in which a second detection time is determined in the embodiment shown in FIG. 8.

In the case that the indication unit is a time slot, FIG. 9 exemplarily illustrates a schematic diagram in which the terminal determines the second detection time based on the preset configuration. Referring to FIG. 9, the base station sends four third detection times to the terminal through the downlink carrier. The terminal determines, based on the preset configuration, that the first third detection time and the third third detection time as the second detection time for detecting the second physical layer channel carrying the indication unit allocation information of uplink carrier.

In the embodiment, the base station pre-configures the detection time the terminal detects the physical layer signal. The base station, according to the detection time, instructs the terminal to detect the physical layer channel carrying the indication unit allocation information. The terminal then determines, based on the preset configuration, whether the detection time is configured to instruct the terminal to detect the physical layer channel carrying the indication unit allocation information of downlink carrier, or to instruct the terminal to detect the physical layer channel carrying the indication unit allocation information of uplink carrier, such that the terminal can determine the transmission directions of the uplink data transmission and downlink data transmission in the target mode. Here, the target mode is a mode in which the terminal performs uplink data transmission and downlink data transmission on different carriers respectively. By means of this method, the terminal can acquire dynamic information for indicating transmission direction in the target mode, to achieve the data transmission in the target mode.

It should be noted that the sequence of the steps of the data transmission method provided by the embodiments of the present disclosure may be appropriately adjusted, and the steps may be omitted or a new step may be added, according to circumstances. Any changed method that can be easily conceived by a person skilled in the art within the technical scope disclosed in the present disclosure should be covered by the protection scope of the present disclosure, and thus is not described herein for conciseness.

The apparatus embodiments of the present disclosure described below can be configured to implement the method embodiments of the present disclosure. Details which are not disclosed in the apparatus embodiments of the present disclosure may make a reference to the method embodiments of the present disclosure.

Figure 10:
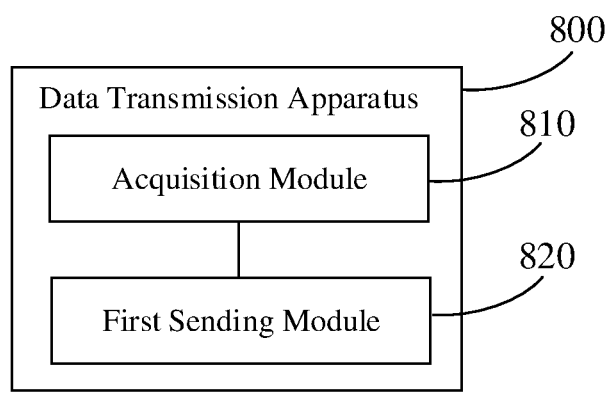
FIG. 10 is a block diagram of a data transmission apparatus in accordance with exemplary embodiment.

FIG. 10 is a block diagram of a data transmission apparatus in accordance with an exemplary embodiment. The data transmission apparatus may be implemented as parts or all of the base station 20 in the implementation environment shown in FIG. 1 through software, hardware, or a combination of both. The data transmission apparatus 800 may include: an acquisition module 810 configured to acquire target information for indicating transmission direction, the target information for indicating transmission direction being configured for a terminal to determine transmission directions of uplink data transmission and downlink data transmission, in a target mode, and the target mode being a mode in which the terminal performs uplink data transmission and downlink data transmission on different carriers respectively; and a first sending module 820 configured to send the target information for indicating transmission direction to the terminal.

In the embodiment, the base station can acquire the target information for indicating transmission direction, and then send the target information for indicating transmission direction to the terminal, such that the terminal determines the transmission directions of the uplink data transmission and downlink data transmission in the target mode based on the target information for indicating transmission direction, wherein the target mode is a mode in which the terminal performs uplink data transmission and downlink data transmission on different carriers respectively. By means of this apparatus, the terminal can acquire dynamic information for indicating transmission direction in the target mode, to achieve the data transmission in the target mode.

In an embodiment, in the first aspect, the acquisition module 810 is configured to: acquire the target information for indicating transmission direction from pre-configured indication unit allocation information, the indication unit allocation information including multiple pieces of information for indicating transmission direction, the target information for indicating transmission direction being one of the multiple pieces of information for indicating transmission direction, and each information for indicating transmission direction including indication unit allocation information of downlink carrier and indication unit allocation information of uplink carrier.

The first sending module 820 is configured to: send the target information for indicating transmission direction to the terminal through a physical layer channel, the physical layer channel being a physical layer channel carrying common control information.

In the second aspect, the acquisition module 810 is configured to: acquire a pre-configured first detection time and a pre-configured second detection time, the first detection time being a time the terminal detects a first physical layer channel, the second detection time being a time the terminal detects a second physical layer channel, the first physical layer channel carrying indication unit allocation information of downlink carrier, the second physical layer channel carrying indication unit allocation information of uplink carrier, and the first physical layer channel and the second physical layer channel being physical layer channels configured for carrying common control information; and determine the first detection time and the second detection time as the target information for indicating transmission direction.

Figure 11:
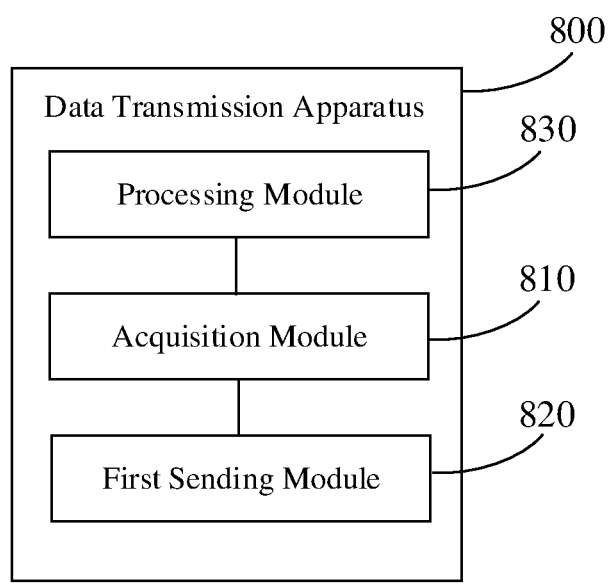
FIG. 11 is a block diagram of a data transmission apparatus in accordance with an exemplary embodiment.

Further, as shown in FIG. 11, the apparatus 800 may further include: a processing module 830 configured to configure the first detection time and the second detection time in the base station based on high-level signaling, MAC CE, or physical layer signaling.

In the third aspect, the acquisition module 810 is configured to: acquire a plurality of pre-configured third detection times, each of the third detection times being a time the terminal detects a physical layer channel, and the physical layer channel carrying indication unit allocation information and being a physical layer channel configured for carrying common control information; and determine the plurality of third detection times as the target information for indicating transmission direction.

Figure 12:
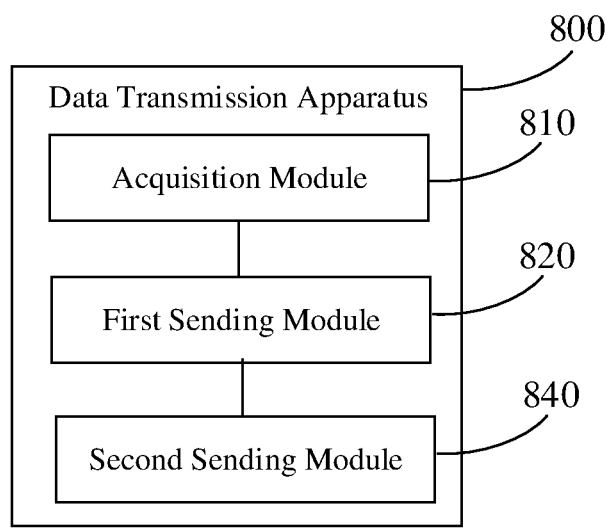
FIG. 12 is a block diagram showing a data transmission apparatus in accordance with an exemplary embodiment.

Further, as shown in FIG. 12, the apparatus 800 may further include: a second sending module 840 configured to send a preset configuration to the terminal through RRC signaling, MAC CE, or physical layer signaling, the preset configuration being configured for indicating a first detection time for detecting a first physical layer channel and a second detection time for detecting a second physical layer channel among the plurality of third detection times, the first physical layer channel carrying indication unit allocation information of downlink carrier, and the second physical layer channel carrying indication unit allocation information of uplink carrier.

In an embodiment, the indication unit may be a time slot, a subframe, a radio frame, or an OFDM symbol.

In an embodiment, the target mode may be an FDD mode.

In the embodiment, the base station can acquire the target information for indicating transmission direction, and then send the target information for indicating transmission direction to the terminal, such that the terminal determines the transmission directions of the uplink data transmission and downlink data transmission in the target mode based on the target information for indicating transmission direction, wherein the target mode is a mode in which the terminal performs uplink data transmission and downlink data transmission on different carriers respectively. By means of this apparatus, the terminal can acquire dynamic information for indicating transmission direction in the target mode, to achieve the data transmission in the target mode.

Figure 13:
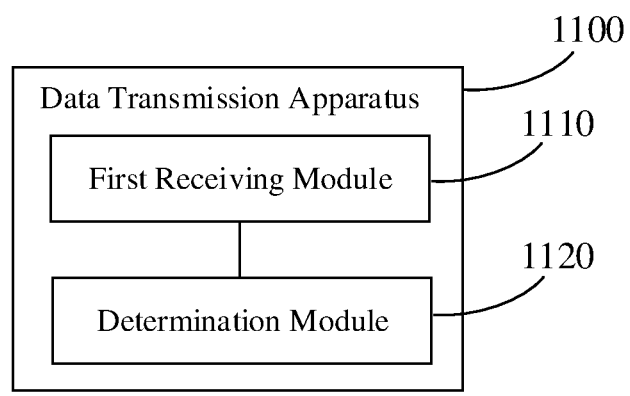
FIG. 13 is a block diagram of a data transmission apparatus in accordance with an exemplary embodiment.

FIG. 13 is a block diagram of a data transmission apparatus in accordance with an exemplary embodiment. The data transmission apparatus can be implemented as parts or all of the terminal 10 in the implementation environment shown in FIG. 1 through software, hardware, or a combination of both. The data transmission apparatus 1100 may include: a first receiving module 1110 configured to receive target information for indicating transmission direction sent by a base station; and a determination module 1120 configured to determine transmission directions of uplink data transmission and downlink data transmission in a target mode based on the target information for indicating transmission direction, the target mode being a mode in which the terminal performs uplink data transmission and downlink data transmission on different carriers respectively.

In the embodiment, the terminal can receive the target information for indicating transmission direction sent by the base station, and then determine the transmission directions of the uplink data transmission and downlink data transmission in the target mode based on the target information for indicating transmission direction, wherein the target mode is a mode in which the terminal performs uplink data transmission and downlink data transmission on different carriers respectively. By means of this method, the terminal can acquire dynamic information for indicating transmission direction in the target mode, to achieve the data transmission in the target mode.

In an embodiment, in the first aspect, the target information for indicating transmission direction includes indication unit allocation information of downlink carrier and indication unit allocation information of uplink carrier. Correspondingly, the determination module 1120 is configured to: determine the transmission direction of the downlink data transmission in the target mode based on the indication unit allocation information of downlink carrier in the target information for indicating transmission direction, and determine the transmission direction of the uplink data transmission in the target mode based on the indication unit allocation information of uplink carrier in the target information for indicating transmission direction.

In an embodiment, the first receiving module 1110 is configured to: receive the target information for indicating transmission direction sent by the base station through a physical layer channel, the physical layer channel being a physical layer channel carrying common control information.

In the second aspect, the target information for indicating transmission direction includes a first detection time and a second detection time, the first detection time being a time the terminal detects a first physical layer channel, the second detection time being a time the terminal detects a second physical layer channel, the first physical layer channel carrying indication unit allocation information of downlink carrier, the second physical layer channel carrying indication unit allocation information of uplink carrier, and the first physical layer channel and the second physical layer channel being physical layer channels carrying common control information. Correspondingly, the determination module 1120 is configured to: detect the first physical layer channel at the first detection time, and determine the transmission direction of the downlink data transmission in the target mode based on the detected indication unit allocation information of downlink carrier; and detect the second physical layer channel at the second detection time, and determine the transmission direction of the uplink data transmission in the target mode based on the detected indication unit allocation information of uplink carrier.

In the third aspect, the target information for indicating transmission direction includes a plurality of third detection times, each of the third detection times being a time the terminal detects a physical layer channel, and the physical layer channel carrying indication unit allocation information and being a physical layer channel carrying common control information. Correspondingly, the determination module 1120 is configured to: determine a first detection time for detecting a first physical layer channel and a second detection time for detecting a second physical layer channel among the plurality of third detection times based on a preset configuration, the first physical layer channel carrying indication unit allocation information of downlink carrier, and the second physical layer channel carrying indication unit allocation information of uplink carrier; detect the first physical layer channel at the first detection time, and determine the transmission direction of the downlink data transmission in the target mode based on the detected indication unit allocation information of downlink carrier; and detect the second physical layer channel at the second detection time, and determine the transmission direction of the uplink data transmission in the target mode based on the detected indication unit allocation information of uplink carrier.

Figure 14:
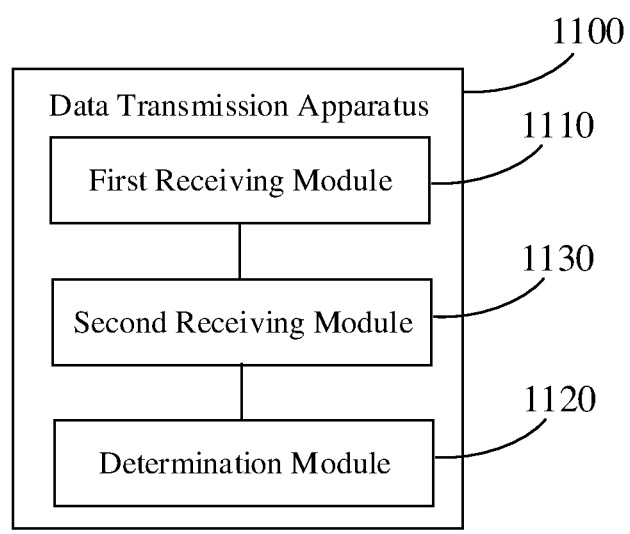
FIG. 14 is a block diagram of a data transmission apparatus in accordance with an exemplary embodiment.

Further, as shown in FIG. 14, the apparatus 1100 may further include: a second receiving module 1130 configured to receive the preset configuration sent by the base station through RRC signaling, MAC CE, or physical layer signaling.

In the embodiment, the terminal can receive the target information for indicating transmission direction sent by the base station, and then determine the transmission directions of the uplink data transmission and downlink data transmission in the target mode based on the target information for indicating transmission direction, wherein the target mode is a mode in which the terminal performs uplink data transmission and downlink data transmission on different carriers respectively. By means of this apparatus, the terminal can acquire dynamic information for indicating transmission direction in the target mode, to achieve the data transmission in the target mode.

An embodiment of the present disclosure further provides a data transmission system, which includes a base station and a terminal.

The base station includes the data transmission apparatus shown in FIG. 10, FIG. 11 or FIG. 12, and the terminal includes the data transmission apparatus shown in FIG. 13 or FIG. 14.

Figure 15:
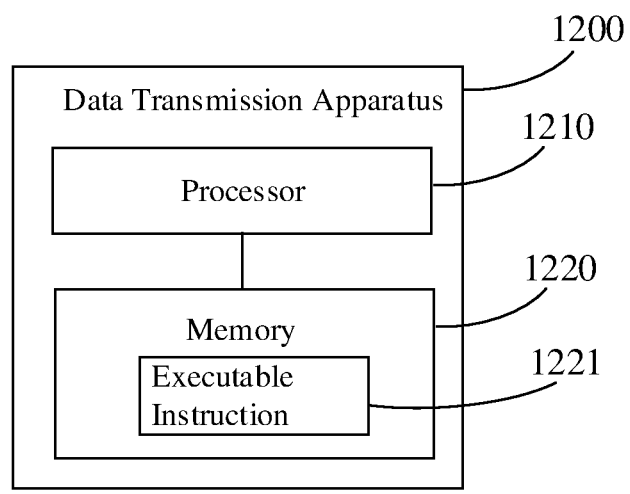
FIG. 15 is a block diagram of a data transmission apparatus in accordance with an exemplary embodiment.

FIG. 15 is a block diagram of a data transmission apparatus 1200 in accordance with an exemplary embodiment. For example, the apparatus 1200 may be a base station. The base station may be the base station 20 in the implementation environment shown in FIG. 1. The data transmission apparatus 1200 includes: a processor 1210; and a memory 1220 configured to store an executable instruction 1221 of the processor, wherein the processor 1210 is configured to perform the data transmission methods described above.

An embodiment of the present disclosure further provides a storage medium configured to store an instruction therein, which, when running on a processing component, causes the processing component to perform the data transmission methods described above.

Figure 16:
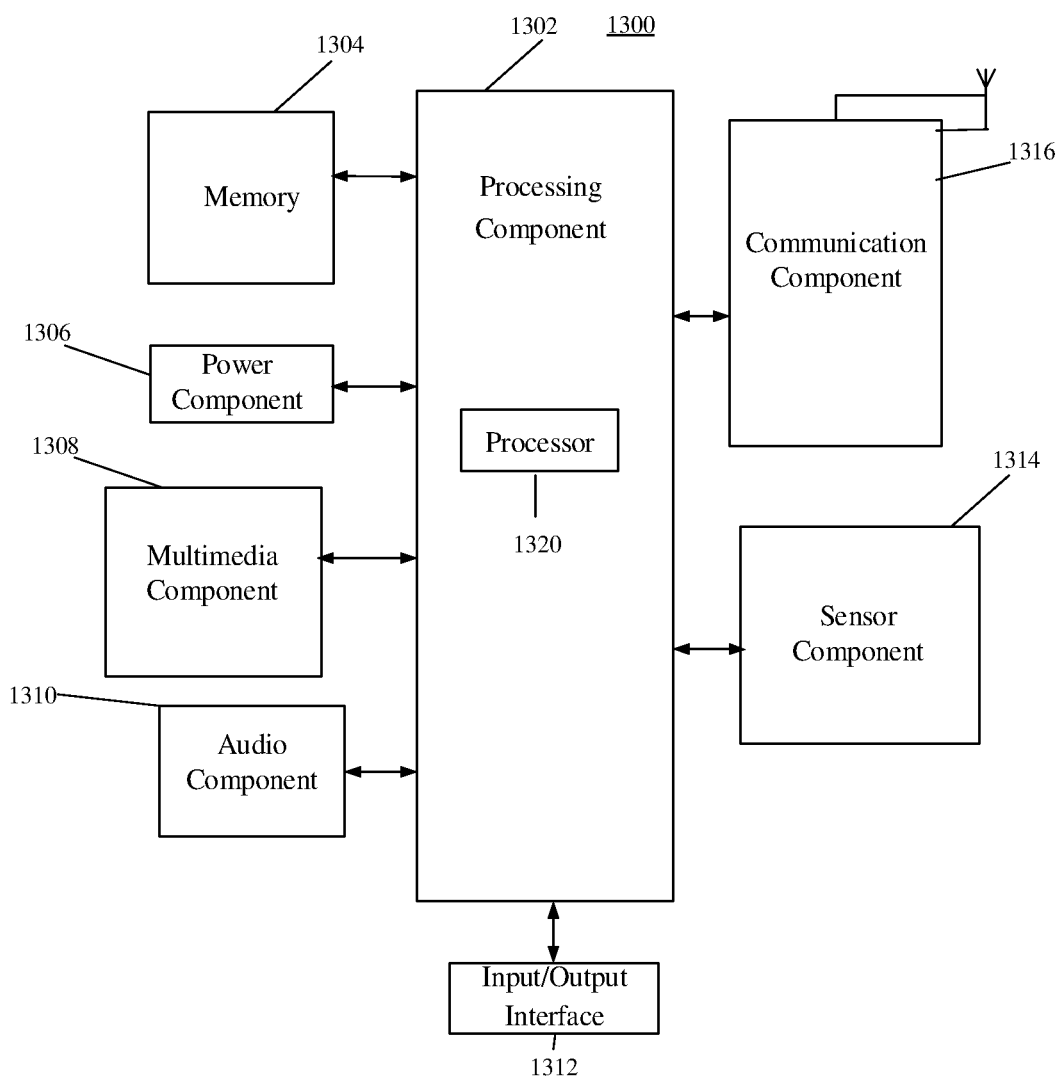
FIG. 16 is a block diagram of a data transmission apparatus in accordance with an exemplary embodiment.

FIG. 16 is a block diagram of a data transmission apparatus 1300 in accordance with an exemplary embodiment. For example, the apparatus 1300 may be a terminal. The terminal may be the terminal 10 in the implementation environment shown in FIG. 1. The terminal may be a mobile platform, a mobile station, a remote station, an access point, a remote terminal device, an access terminal device, a user terminal device, or the like.

Referring to FIG. 16, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls the overall operations of the apparatus 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the apparatus 1300. Examples of such data include instructions for any applications or methods operated on the apparatus 1300, contact data, phonebook data, messages, pictures, videos, etc. The memory 1304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power in the apparatus 1300.

The multimedia component 1308 includes a screen providing an output interface between the apparatus 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1308 includes a front camera and/or a rear camera. The front camera and the rear camera may receive external multimedia data while the apparatus 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (WC) configured to receive external audio signals when the apparatus 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker for outputting audio signals.

The I/O interface 1312 provides an interface between the processing component 1302 and peripheral interface modules, such as a keyboard, a click wheel, buttons, and the like. The buttons may include, but are not limited to, a home button, a volume button, a start button, and a lock button.

The sensor component 1314 includes one or more sensors to provide status assessments of various aspects of the apparatus 1300. For instance, the sensor component 1314 may detect an on/off status of the apparatus 1300, relative positioning of components, e.g., the display device and the mini keyboard of the apparatus 1300, and the sensor component 1314 may also detect a position change of the apparatus 1300 or a component of the apparatus 1300, presence or absence of user contact with the apparatus 1300, orientation or acceleration/deceleration of the apparatus 1300, and temperature change of the apparatus 1300. The sensor component 1314 may include a proximity sensor configured to detect the presence of nearby object. As without any physical contact. The sensor component 1314 may also include a light sensor, such as a CMOS or CCD image sensor, used for imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 and other devices. The apparatus 1300 can access a wireless network based on a communication standard, such as WiFi, 4G, or 5G, or a combination thereof. In an exemplary embodiment, the communication component 1316 receives broadcast signals or broadcast associated information from an external broadcast management system via a broadcast channel. In an exemplary embodiment, the communication component 1316 further includes a near field communication (NFC) module to facilitate short-range communications. In an exemplary embodiment, the communication component 1316 may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the data transmission methods described above.

In exemplary embodiments, a non-transitory computer-readable storage medium including instructions is also provided, such as the memory 1304 including instructions, executable by the processor 1320 in the apparatus 1300, for performing the above-described methods. For example, the non-transitory computer-readable storage medium may be a ROM, a RAM, a CD-ROM a magnetic tape, a floppy disc, an optical data storage device, and the like.

An embodiment of the present disclosure further provides a data transmission system, which includes a base station and a terminal.

The base station includes the data transmission apparatus shown in FIG. 15, and the terminal includes the data transmission apparatus shown in FIG. 16.

Other embodiments of the present disclosure will be apparent to those skilled in the art from consideration of the description and practice of the present disclosure. The present disclosure is intended to cover any variations, uses, or adaptations of the present disclosure following the general principles thereof and including common knowledge or commonly used technical measures which are not disclosed herein. The description and embodiments are to be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure can only be limited by the appended claims.

The invention claimed is:

1. A data transmission method, applied to a base station, comprising:

acquiring target information for indicating transmission direction from pre-configured indication unit allocation information, the target information for indicating transmission direction being configured for a terminal to determine transmission directions of uplink data transmission on an uplink slot and downlink data transmission on a downlink slot in a frequency division duplexing (FDD) mode; and sending the target information for indicating transmission direction to the terminal, to cause the terminal to determine respective transmission directions of the uplink slot and the downlink slot in the FDD mode according to the target information for indicating transmission direction, wherein the pre-configured indication unit allocation information comprises multiple pieces of information for indicating transmission direction, the target information for indicating transmission direction is one of the multiple pieces of information for indicating transmission direction, and each of the multiple pieces of information for indicating transmission direction comprises indication unit allocation information of downlink carrier and indication unit allocation information of uplink carrier; and the indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for a uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

2. The method according to claim 1, wherein the sending the target information for indicating transmission direction to the terminal comprises:
sending the target information for indicating transmission direction to the terminal through a physical layer channel, the physical layer channel being a physical layer channel carrying common control information.

3. The method according to claim 1, wherein the acquiring the target information for indicating transmission direction comprises:
acquiring a pre-configured first detection time and a pre-configured second detection time, the first detection time being a time the terminal detects a first physical layer channel, the second detection time being a time the terminal detects a second physical layer channel, the first physical layer channel carrying indication unit allocation information of downlink carrier, the second physical layer channel carrying indication unit allocation information of uplink carrier, and the first physical layer channel and the second physical layer channel being physical layer channels configured for carrying common control information; and
determining the first detection time and the second detection time as the target information for indicating transmission direction.

4. The method according to claim 3, further comprising:
configuring the first detection time and the second detection time in the base station based on high-level signaling, a Media Access Control control element (MAC CE), or physical layer signaling.

5. The method according to claim 1, wherein the acquiring the target information for indicating transmission direction comprises:
acquiring a plurality of pre-configured third detection times, each of the third detection times being a time the terminal detects a physical layer channel, and the physical layer channel carrying indication unit allocation information and being a physical layer channel configured for carrying common control information; and
determining the plurality of third detection times as the target information for indicating transmission direction.

6. The method according to claim 5, further comprising:
sending a preset configuration to the terminal through radio resource control (RRC) signaling, MAC CE, or physical layer signaling, the preset configuration being configured for indicating a first detection time for detecting a first physical layer channel and a second detection time for detecting a second physical layer channel among the plurality of third detection times, the first physical layer channel carrying indication unit allocation information of downlink carrier, and the second physical layer channel carrying indication unit allocation information of uplink carrier.

7. A data transmission method, applied to a terminal, comprising:
receiving target information for indicating transmission direction sent by a base station, the target information for indicating transmission direction comprising indication unit allocation information of downlink carrier and indication unit allocation information of uplink carrier; and
determining, based on the indication unit allocation information of downlink carrier and the indication unit allocation information of uplink carrier, transmission directions of uplink data transmission on an uplink slot and downlink data transmission on a downlink slot in a frequency division duplexing (FDD) mode,
wherein the target information for indicating transmission direction is one of multiple pieces of information for indicating transmission direction acquired by the base station, and each of the multiple pieces of information for indicating transmission direction comprises indication unit allocation information of downlink carrier and indication unit allocation information of uplink carrier; and
the indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for an uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

8. The method according to claim 7, wherein the receiving the target information for indicating transmission direction sent by the base station comprises:
receiving the target information for indicating transmission direction sent by the base station through a physical layer channel, the physical layer channel being a physical layer channel carrying common control information.

9. The method according to claim 7, wherein the target information for indicating transmission direction comprises a first detection time and a second detection time, the first detection time being a time the terminal detects a first physical layer channel, the second detection time being a time the terminal detects a second physical layer channel, the first physical layer channel carrying indication unit allocation information of downlink carrier, the second physical layer channel carrying indication unit allocation information of uplink carrier, and the first physical layer channel and the second physical layer channel being physical layer channels carrying common control information; and
the determining the transmission directions of the uplink data transmission and downlink data transmission in the FDD mode comprises:
detecting the first physical layer channel at the first detection time, and determining the transmission direction of the downlink data transmission in the FDD mode based on the indication unit allocation information of downlink carrier in the detected first physical layer channel; and
detecting the second physical layer channel at the second detection time, and determining the transmission direction of the uplink data transmission in the FDD mode based on the indication unit allocation information of uplink carrier in the detected second physical layer channel.

10. The method according to claim 7, wherein the target information for indicating transmission direction comprises a plurality of third detection times, each of the third detection times being a time the terminal detects a physical layer channel, and the physical layer channel carrying indication unit allocation information and being a physical layer channel carrying common control information; and the determining the transmission directions of the uplink data transmission and downlink data transmission in the FDD mode comprises:
determining a first detection time for detecting a first physical layer channel and a second detection time for detecting a second physical layer channel among the plurality of third detection times based on a preset configuration, the first physical layer channel carrying indication unit allocation information of downlink carrier, and the second physical layer channel carrying indication unit allocation information of uplink carrier;
detecting the first physical layer channel at the first detection time, and determining the transmission direction of the downlink data transmission in the FDD mode based on the indication unit allocation information of downlink carrier in the detected first physical layer channel; and
detecting the second physical layer channel at the second detection time, and determining the transmission direction of the uplink data transmission in the FDD mode based on the indication unit allocation information of uplink carrier in the detected second physical layer channel.

11. The method according to claim 10, further comprising:
receiving the preset configuration sent by the base station through RRC signaling, MAC CE, or physical layer signaling.

12. A base station, comprising:
a processor; and
a memory storing instructions executable by the processor;
wherein the processor is configured to:
acquire target information for indicating transmission direction from pre-configured indication unit allocation information, the target information for indicating transmission direction being configured for a terminal to determine transmission directions of uplink data transmission on an uplink slot and downlink data transmission on a downlink slot in a frequency division duplexing (FDD) mode; and
send the target information for indicating transmission direction to the terminal, to cause the terminal to determine respective transmission directions of the uplink slot and the downlink slot in the FDD mode according to the target information for indicating transmission direction,
wherein the pre-configured indication unit allocation information comprises multiple pieces of information for indicating transmission direction, the target information for indicating transmission direction is one of the multiple pieces of information for indicating transmission direction, and each of the multiple pieces of information for indicating transmission direction comprises indication unit allocation information of downlink carrier and indication unit allocation information of uplink carrier; and
the indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for a uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

13. The base station according to claim 12, wherein the processor is further configured to:
send the target information for indicating transmission direction to the terminal through a physical layer channel, the physical layer channel being a physical layer channel carrying common control information.

14. The base station according to claim 12, wherein the processor is further configured to:
acquire a pre-configured first detection time and a pre-configured second detection time, the first detection time being a time the terminal detects a first physical layer channel, the second detection time being a time the terminal detects a second physical layer channel, the first physical layer channel carrying indication unit allocation information of downlink carrier, the second physical layer channel carrying indication unit allocation information of uplink carrier, and the first physical layer channel and the second physical layer channel being physical layer channels configured for carrying common control information; and
determine the first detection time and the second detection time as the target information for indicating transmission direction.

15. The base station according to claim 14, wherein the processor is further configured to:
configure the first detection time and the second detection time in the base station based on high-level signaling, a Media Access Control control element (MAC CE), or physical layer signaling.

16. A terminal, comprising:
a processor; and
a memory storing instructions executable by the processor;
wherein the processor is configured to:
receive target information for indicating transmission direction sent by a base station, the target information for indicating transmission direction comprising indication unit allocation information of downlink carrier and indication unit allocation information of uplink carrier; and
determine, based on the indication unit allocation information of downlink carrier and the indication unit allocation information of uplink carrier, transmission directions of uplink data transmission on an uplink slot and downlink data transmission on a downlink slot in a frequency division duplexing (FDD) mode,
wherein the target information for indicating transmission direction is one of multiple pieces of information for indicating transmission direction acquired by the base station, and each of the multiple pieces of information for indicating transmission direction comprises indication unit allocation information of downlink carrier and indication unit allocation information of uplink carrier; and
the indication unit allocation information of downlink carrier is configured to reserve a part of resources for a downlink carrier such that a state of a downlink slot of the downlink carrier comprises an unknown state, and the indication unit allocation information of uplink carrier is configured to reserve a part of resources for an uplink carrier such that a state of an uplink slot of the uplink carrier comprises the unknown state, wherein the unknown state does not indicate whether an orthogonal frequency division multiplexing (OFDM) symbol is an uplink transmission or a downlink transmission.

17. The terminal according to claim 16, wherein the processor is further configured to:
receive the target information for indicating transmission direction sent by the base station through a physical layer channel, the physical layer channel being a physical layer channel carrying common control information.

18. The terminal according to claim 16, wherein the target information for indicating transmission direction comprises a first detection time and a second detection time, the first detection time being a time the terminal detects a first physical layer channel, the second detection time being a time the terminal detects a second physical layer channel, the first physical layer channel carrying indication unit allocation information of downlink carrier, the second physical layer channel carrying indication unit allocation information of uplink carrier, and the first physical layer channel and the second physical layer channel being physical layer channels carrying common control information; and
the processor is further configured to:
detect the first physical layer channel at the first detection time, and determine the transmission direction of the downlink data transmission in the FDD mode based on the indication unit allocation information of downlink carrier in the detected first physical layer channel; and
detect the second physical layer channel at the second detection time, and determine the transmission direction of the uplink data transmission in the FDD mode based on the indication unit allocation information of uplink carrier in the detected second physical layer channel.

19. The terminal according to claim 16, wherein the target information for indicating transmission direction comprises a plurality of third detection times, each of the third detection times being a time the terminal detects a physical layer channel, and the physical layer channel carrying indication unit allocation information and being a physical layer channel carrying common control information; and
the processor is further configured to:
determine a first detection time for detecting a first physical layer channel and a second detection time for detecting a second physical layer channel among the plurality of third detection times based on a preset configuration, the first physical layer channel carrying indication unit allocation information of downlink carrier, and the second physical layer channel carrying indication unit allocation information of uplink carrier;
detect the first physical layer channel at the first detection time, and determine the transmission direction of the downlink data transmission in the FDD mode based on the indication unit allocation information of downlink carrier in the detected first physical layer channel; and
detect the second physical layer channel at the second detection time, and determine the transmission direction of the uplink data transmission in the FDD mode based on the indication unit allocation information of uplink carrier in the detected second physical layer channel.

20. The terminal according to claim 19, wherein the processor is further configured to:
receive the preset configuration sent by the base station through RRC signaling, MAC CE, or physical layer signaling.

* * * * *